United States Patent [19]

Matsushita et al.

[11] Patent Number: 5,238,257
[45] Date of Patent: Aug. 24, 1993

[54] REAR WHEEL STEERING DEVICE

[75] Inventors: Shigehisa Matsushita; Osamu Sano, both of Nara, Japan

[73] Assignee: Koyo Seiko Co., Ltd., Osaka, Japan

[21] Appl. No.: 889,351

[22] Filed: May 28, 1992

[30] Foreign Application Priority Data

| May 31, 1991 | [JP] | Japan | 3-157749 |
| Oct. 17, 1991 | [JP] | Japan | 3-93112[U] |
| Feb. 3, 1992 | [JP] | Japan | 4-10903[U] |

[51] Int. Cl.$^5$ ............................................. B62D 3/06
[52] U.S. Cl. ............................................. 280/91; 74/499
[58] Field of Search .............................. 280/91; 74/499

[56] References Cited

U.S. PATENT DOCUMENTS

| 4,249,456 | 2/1981 | Lüchel et al. | 74/499 |
| 4,295,657 | 10/1981 | Sano et al. | 280/91 |
| 4,614,351 | 9/1986 | Sano et al. | 280/91 |
| 4,758,012 | 7/1988 | Ogura et al. | 280/91 |
| 4,779,880 | 10/1988 | Hyodo | 280/91 |
| 5,020,812 | 6/1991 | Sugiyama | 280/91 |

FOREIGN PATENT DOCUMENTS

| 60-44186 | 2/1985 | Japan . |
| 60-50078 | 8/1985 | Japan . |
| 62-181960 | 10/1987 | Japan . |
| 62-181961 | 10/1987 | Japan . |

*Primary Examiner*—Margaret A. Focarino
*Assistant Examiner*—Paul Dickson
*Attorney, Agent, or Firm*—Mason, Fenwick & Lawrence

[57] ABSTRACT

A rear wheel steering device comprising an input shaft which rotates about an axis oriented from front to rear in response to a steering angle of front wheels, a screw shaft which is united with the input shaft and has an axis eccentrically arranged with the axis of the input shaft, a nut which is meshed with the screw shaft, a rack formed on the nut, and a pinion meshed with the rack and connected to the nut. The pinion is supported in a manner that it is rotatable about a substantially vertical axis and movable in the rightward and leftward transverse direction. The pinion is meshed with a rear wheel steering rack. The rotation of the input shaft causes the screw shaft to rotate and whirl. In response to the rotation and the whirling motion of the screw shaft, the rear wheel steering rack moves in the rightward and leftward transverse direction. The rear wheels are steered by the transverse movement of the rear wheel steering rack.

19 Claims, 6 Drawing Sheets

REAR WHEEL STEERING DEVICE

FIELD OF THE INVENTION

The present invention relates to a rear wheel steering device for a four-wheel steering vehicle in which rear wheels are steered by a transverse movement in the rightward and leftward direction of a rear wheel steering rack in response to a steering angle of front wheels.

DESCRIPTION OF THE RELATED ART

In a steering angle responding type of four-wheel steering vehicle, rear wheels are forced to move complicatedly in response to the steering angle of front wheels. For example, a rear wheel steering device, disclosed by Japanese Examined Patent Publication 60-44186, comprises a cam moving in response to the steering angle of front wheels and a cam follower fitted on a rear wheel steering shaft, wherein the rear wheel steering shaft is moved in the rightward and leftward direction by transmitting the movement of the cam to the rear wheel steering shaft through the cam follower, rear wheels are steered by said transverse movement of the rear wheel steering shaft. Also, in a rear wheel steering device, disclosed by Japanese Unexamined Utility Model Publication 60-50078, a rear wheel steering rack is moved in the rightward and leftward direction by transmitting the rotation of an input shaft according to the steering angle of the front wheels to the rear wheel steering rack through a crank mechanism and a planetary gearing mechanism, rear wheels are steered by said transverse movement of the rear wheel steering rack.

In a four-wheel steering vehicle, when both the front wheels and the rear wheels are restored to their straight track steering positions, both the front wheels and the rear wheels suffer resistance from the ground they are in contact. The four-wheel steering vehicle thus requires a larger force to restore a steering wheel to its straight track steering position, compared with the normal vehicle in which only the front wheels are steered. To cope with this disadvantage, a mechanism has been proposed (Japanese Unexamined Patent Publication 62-181961), wherein a reference surface is formed onto the exterior of a steering column which links a steering wheel to a front wheel steering device, a pressure member is pressed onto the reference surface by means of a spring, and, thus, a force results in a manner that the steering column is restored to its straight track steering position. An another mechanism has been proposed (Japanese Unexamined Patent Publication 62-181960), wherein a torsion coil spring is wound on a link shaft which links the front wheel steering device to the rear wheel steering device in a manner that one end of the torsion spring is connected to the link shaft and the other end connected to the vehicle body, and a force results in a manner that the link shaft is restored to its straight track steering position.

OBJECT AND SUMMARY OF THE INVENTION

In the conventional mechanism where a steering force is transmitted via a cam and cam follower to the rear wheel steering shaft, resistance involved in transmission is too large to perform steering operation in a smooth manner. In another conventional mechanism where a steering force is transmitted via a crank mechanism and a planetary gearing mechanism to the rear wheel steering rack, the construction of the mechanism becomes too complicated to be practicable, and the transmission efficiency of steering force is very low.

The steering column which links the steering wheel to the front wheel steering device rotates, generally beyond 360°; when the pressure member is pressed onto the reference surface formed onto the exterior of the steering column, the pressure member is pressed onto the reference surface even if the steering column is placed out of its straight track steering position, and thus, the steering column may be restored to other position than the straight track steering position. Furthermore, since the spring's resilient force acts on the steering column in a unidirectional manner, bearings which support the steering column suffer deviative wear. On the other hand, in the case where the link shaft which links the front wheel steering device to the rear wheel steering device is restored to its straight track steering position by using the resilient force of the torsion coil spring, the angle of torsion of the torsion coil spring decreases as the link shaft is near to its straight track steering position, and thus, sufficient restoring force fails to develop in the vicinity of the straight track steering position. Furthermore, helical wires which form the torsion coil spring rub against each other, thereby suffering wear. Furthermore, the torsion coil spring presents difficulty in its connection. Even if it is properly connected, the torsion coil spring may tend to come off easily.

It is an object of the present invention to provide a rear wheel steering device for a four-wheel steering vehicle which overcomes the above-mentioned disadvantage.

The rear wheel steering device according to the present invention comprises an input shaft which rotates about an axis oriented from front to rear of the vehicle in response to the steering angle of the front wheels, a screw shaft which is united with the input shaft and has an axis eccentrically arranged with the axis of the input shaft, a nut which is meshed with the screw shaft, a rack formed on the nut, and a pinion meshed with the rack and connected to the nut, wherein the pinion is supported in a manner that it is rotatable about a substantially vertical axis and movable in the rightward and leftward transverse direction, and the pinion is meshed with a rear wheel steering rack.

The rotation of the input shaft causes the screw shaft, which is united with the input shaft, to rotate. The rotation of the screw shaft causes the nut, which is meshed with the screw shaft, to move in the backward and forward direction of the vehicle. This backward and forward movement of the nut causes the pinion, which is meshed with the rack formed on the nut, to rotate about the substantially vertical axis. In response to the rotation of the pinion, the rear wheel steering rack which is meshed with the pinion moves in the rightward and leftward transverse direction. Also, the rotation of the input shaft causes the screw shaft, which has an axis eccentrically arranged with the axis of the input shaft, to whirl. In response to the whirling motion of the screw shaft, the nut meshed with the screw shaft moves in the rightward and leftward transverse direction. This transverse movement of the nut moves the pinion in said transverse direction. This transverse movement of the pinion moves the rear wheel steering rack, which is meshed with the pinion, in said transverse direction. Namely, the transverse movement of the rear wheel steering rack is a combination of the movement arising from the rotation of the screw shaft and of the movement arising from the whirling motion of the screw shaft. Steering of the rear wheels is performed by the transverse movement of the rear wheel steering rack.

The displacement of the rear wheel steering rack arising from the rotation of the screw shaft varies in proportion to a front wheel steering angle. The displacement of the rear wheel steering rack arising from the whirling motion of the screw shaft varies periodically in response to the front wheel steering angle. Setting properly the gear ratio of the pinion to the rack and eccentricity of the screw shaft axis to the input shaft axis allows the rear wheel steering rack to move in a desired manner in response to variations of the front wheel steering angle. The device according to the present invention is smaller in its transmission resistance of the steering force than the mechanism where the cam and the cam follower are employed, thus, results in higher transmission efficiency, and simpler in its construction of transmission of the steering force than the mechanism where a crank mechanism and an planetary gearing mechanism are employed, and thus, more practicable.

The present invention preferably comprises a housing which is mounted on the vehicle body, a swing member which is supported by the housing in a manner that it is capable of swing in the rightward and leftward transverse direction about a substantially vertical axis, a roller which is supported by the swing member with the pinion in a manner that they are capable of rotation about a substantially vertical axis, wherein the pinion and the roller are arranged along the rightward and leftward transverse direction, the pinion is connected to the nut by sandwiching the nut between the pinion and the roller.

Since the swing motion of the swing member causes the pinion and the roller to move in said transverse direction, the pinion and the roller move in an arc orbit. Thereby in response to the displacement arising from the swing of the swing member, the transverse distance along the rightward and leftward direction between the pinion and the roller varies. When the transverse distance between the pinion and the roller gets smaller, the pinion and the roller are tightly pressed against the nut; thus, the backward and forward movement of the nut is impeded, preventing the rear wheel steering rack from accurately following the rotation of the screw shaft. When the transverse distance between the pinion and the roller gets larger, a large clearance generates between the nut and the pinion, preventing the rear wheel steering rack from accurately following the whirling motion of the screw shaft. To overcome the disadvantage, the contact portion of the nut with the roller is desirably formed unevenly according t the displacement of the transverse distance between the pinion and the roller. Such an arrangement allows the width of the nut to narrow at a position where the transverse distance between the pinion and the roller is smaller, and allows the width of the nut to widen at a position where the transverse distance between the pinion and the roller is larger; thus, the pinion will not be pressed against the nut with a large force, and no large clearance generates between the pinion and the nut. As a result, the rear wheel steering rack accurately follows the rotation and the whirling motion of the screw shaft.

In the straight track steering position, the line segment connecting the center of rotation of the pinion to the center of rotation of the roller is desirably parallel to an axis oriented from left to right of the rear wheel steering rack, and the line segment connecting the center of rotation of the pinion to the center of swing of the swing member is desirably perpendicular to the axis of the rear wheel steering rack. In case of the line segment connecting the center of rotation of the pinion to the center of rotation of the roller is parallel to the axis of the rear wheel steering rack in the straight track steering position, when the pinion exerts a pressure which acts on the rear wheel steering rack based on the whirling motion of the screw shaft, components of the pressure other than one acting along the rightward and leftward direction are kept to a minimum; thus, the pressure is transmitted from the pinion to the rear wheel steering rack in an effective manner. Also, in case of the line segment connecting the center of rotation of the pinion to the center of swing of the swing member is perpendicular to the axis of the rear wheel steering rack in the straight track steering state, backlash variations between the pinion and the rear wheel steering rack are kept to a minimum when the pinion moves in the arc orbit; thus, the rear wheel steering rack based on the rotation of the pinion moves in a smooth manner.

Desirably, the range of rotation of the input shaft is set to less than 360°, a reference surface is formed on the exterior of the input shaft, a covering member is provided to cover the reference surfaces, a pressure member is held by the covering member, a compression coil spring is provided to press the pressure member against the reference surface, and a restoring force is developed to restore the input shaft to its straight track position by pressing the pressure member against the reference surface. By pressing the pressure member against the reference surface formed on the input shaft using the compression coil spring, the force for restoring the input shaft to its straight track steering position is generated. In case of the range of rotation of the input shaft is set to less than 360°, no force generates for the input shaft to restore other position than its straight track steering position. A sufficiently large restoring force works to restore the input shaft to its straight track steering position even in the vicinity of the straight track steering position, because the pressure member is pressed against the reference surface by means of resiliency of the compression coil spring.

Desirably, each pair of reference surfaces, pressure members, and compression coil springs are provided, the both reference surfaces disposed apart with each other along the axis of the input shaft. Also, desirably, the both reference surfaces are 180° apart with each other along the circumference of the input shaft. Such an arrangement allows resiliency of each compression coil spring to act on each reference surface. Since the reference surfaces are 180° apart with each other along the circumference of the input shaft, the compression working on the input shaft is not unevenly distributed; thus, bearings which support the input shaft suffer no deviative wear. Since the both reference surfaces are apart with each other along the axis of the input shaft, even when the input shaft rotates by 180°, one pressure member which is designed to press against one reference surface does not press against the other surface; on the other hand, the other pressure member which is designed to press against the other reference surface does not press against the first reference surface. Thus, no force is generated for the input shaft to restore to other position than its straight track steering position.

DETAILED DESCRIPTION OF THE PREFERRED EMBODIMENT

Referring now to the drawings, the embodiment of the present invention is described below.

Figure 4:
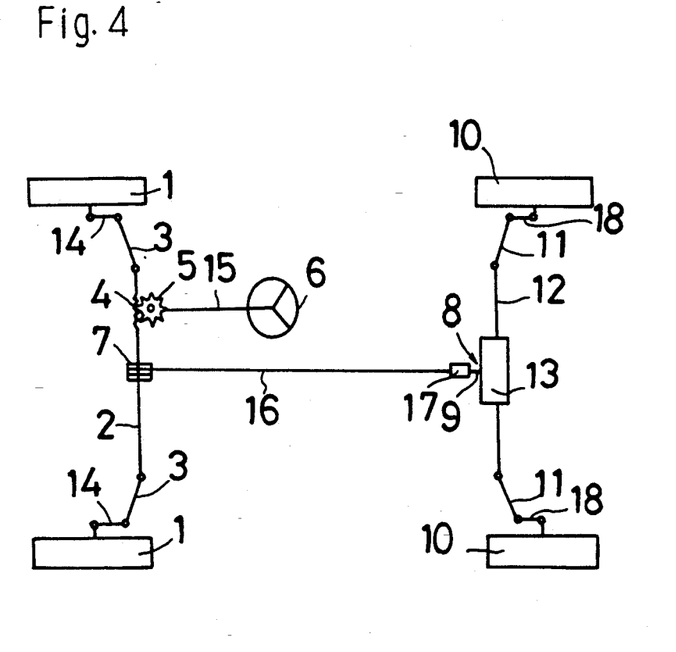
FIG. 4 is a drawing illustrating the construction of the four-wheel steering vehicle according to the embodiment of the present invention.

FIG. 4 is a rough drawing of a four-wheel steering vehicle in which the rear wheel steering angle is controlled in response to the front wheel steering angle. Front wheels 1 are linked with each other via a front wheel steering member 2, tie-rods 3, and steering knuckle arms 14. Provided on the front wheel steering member 2 is a rack 4 with which a pinion 5 is meshed. The pinion 5 is linked to a steering wheel 6 via a steering column 15. Operating the steering wheel 6 moves the front wheel steering member 2 in the rightward and leftward transverse direction, allowing the front wheels 1 to be steered.

Formed on the front wheel steering member 2, besides the rack 4, is another rack (omitted from the figure) with which a pinion 7 is meshed. The pinion 7 is connected to the front end of the link shaft 16. The rear end of the link shaft 16 is connected to an input shaft 9 of a rear wheel steering device 8 via a coupling 17. The input shaft 9 is rotatable about its axis 9c oriented from front to rear of the vehicle. In the above construction, said transverse movement of the front wheel steering member 2 according to the steering operation causes the pinion 7 to rotate, and the input shaft 9 rotates corresponding to a front wheel steering angle by the rotation of the pinion 7. The range of rotation of the input shaft 9 is set to less than 360°.

The rear wheel steering device 8 is provided with a conversion device 13 which converts the rotation of the input shaft 9 to a transverse movement in the rightward and leftward direction of a rear wheel steering rack 12. The rear wheel steering rack 12 is supported by the vehicle body in a manner that allows the rack 12 to move in said transverse direction. Each opposite end of the rear wheel steering rack 12 is linked to respective rear wheel 10 via a tie-rod 11 and a steering knuckle arm 18.

Figure 1:
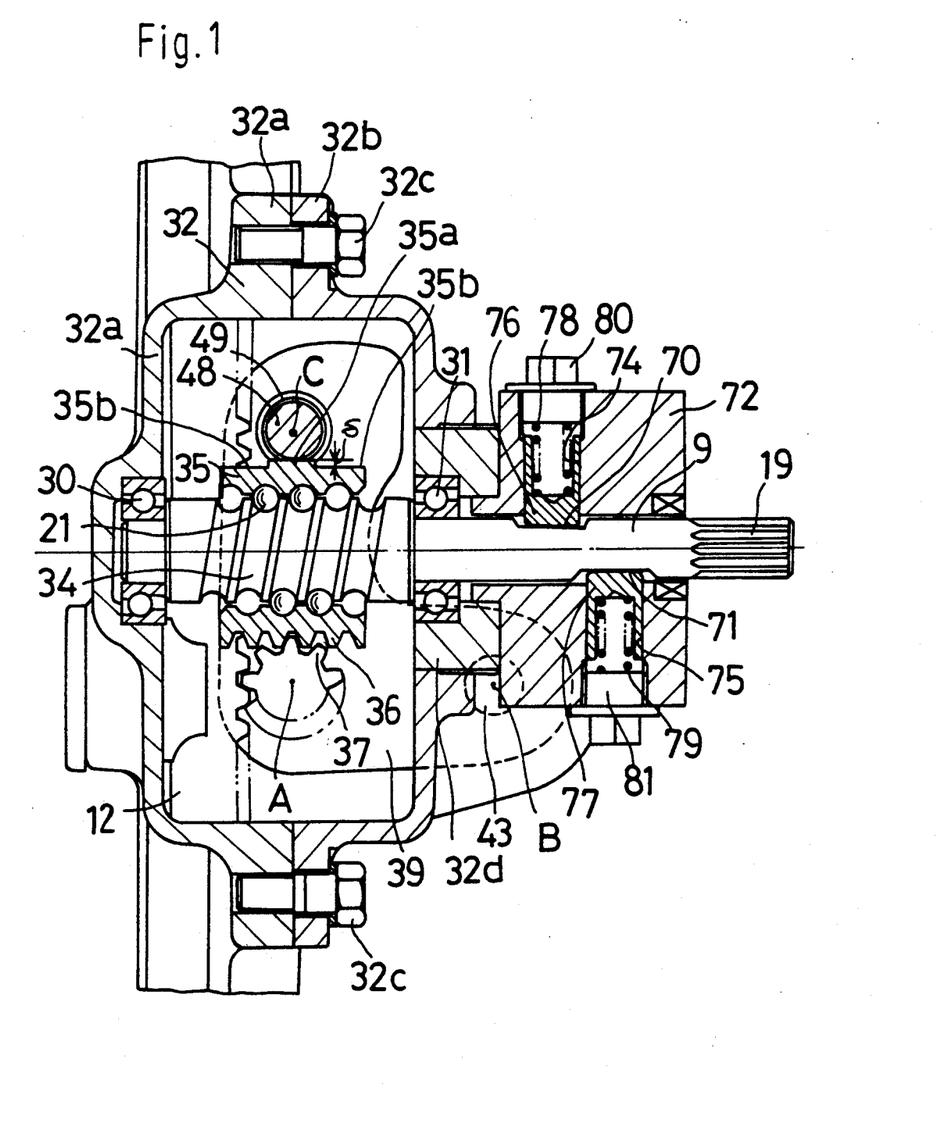
FIG. 1 is a plane cross-sectional view showing a major part of a rear wheel steering device according to an embodiment of the present invention.
Figure 2:
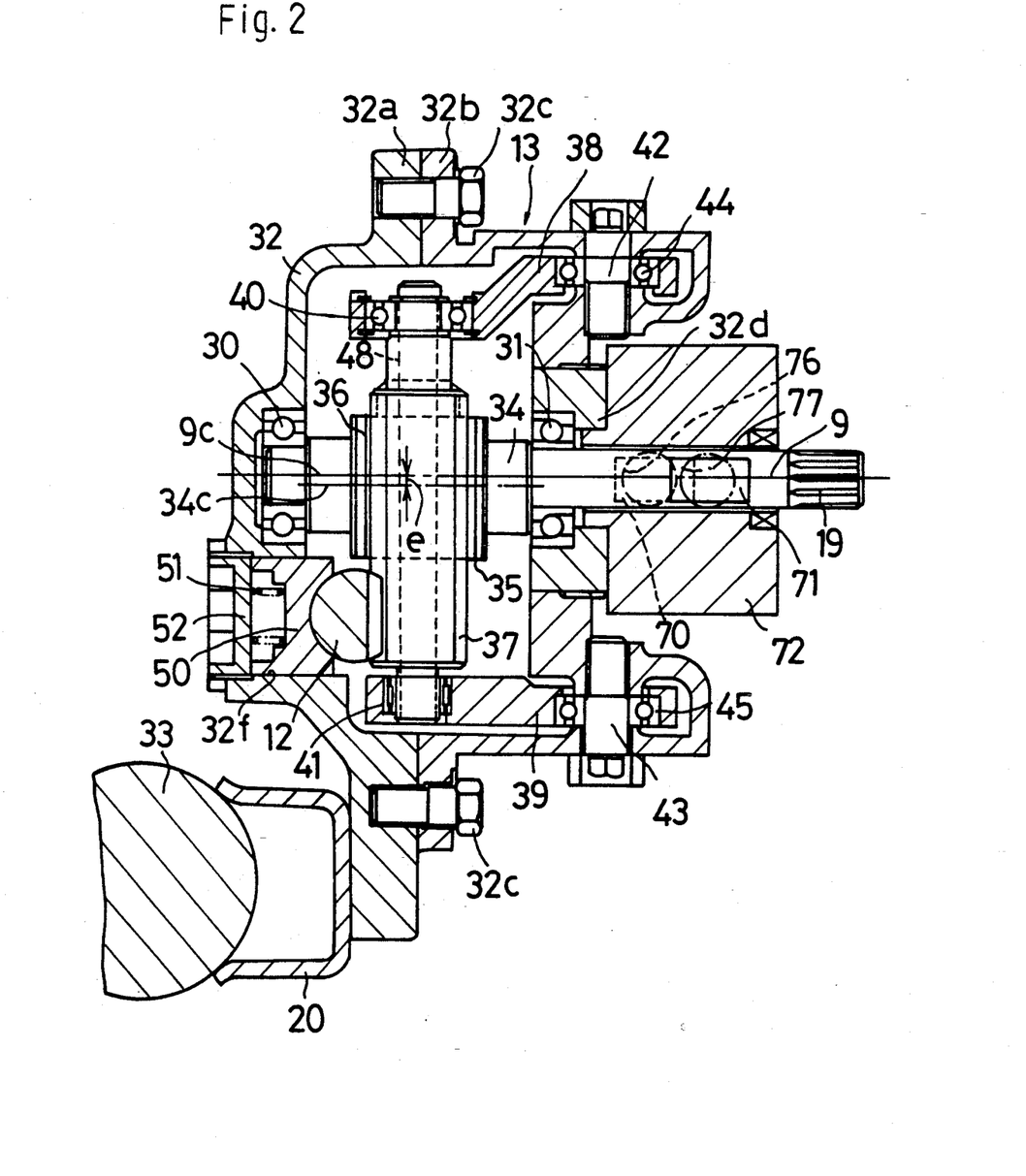
FIG. 2 is a vertical cross-sectional view showing the major part of the rear wheel steering device according to the embodiment of the present invention.

As shown in FIG. 1 and FIG. 2, the conversion device 13 has a housing 32 which supports the input shaft 9 by means of a pair of bearings 30 and 31. The housing 32 has a forward member 32a and a backward member 32b, both of which are connected to each other with bolts 32c. The housing 32 is also connected to a vehicle body component member 33 via bracket 20. The bearing 31 which supports the input shaft 9 is mounted on the block 32d which is screwed into the backward member 32b. The end portion of the input shaft 9 which is projected out of the block 32d is provided with spline 19, to which the coupling 17 is connected.

Inside the housing 32, an screw shaft 34 is integrally formed with the input shaft 9. In this embodiment, the screw shaft 34 is a ball screw. As shown in FIG. 2, the axis 34c of the screw shaft 34 is eccentrically arranged by "e" off the axis 9c of the input shaft 9.

A nut 35 is meshed with the screw shaft 34. The nut 35 is, in this embodiment, a ball nut, and balls 21 are placed into between the nut 35 and the screw shaft 34. A rack 36 is formed on the nut 35. The axis of the rack 36 is oriented from front to rear of the vehicle.

A pinion 37 is disposed to be meshed with the rack 36. The pinion 37 has a substantially vertical axis. The pinion 37 is rotatably supported by a pair of top and bottom arms (swing members) 38 and 39 through bearings 40 and 41. Both arms 38 and 39 are rotatably supported by supporting shafts 42 and 43 through bearings 44 and 45. Both shafts 42 and 43 are screwed into the housing 32 and have a common substantially vertical axis. This arrangement allows the arms 38 and 39 to swing in the rightward and leftward transverse direction about the axis of the supporting shafts 42 and 43 as center B of swing. The swing of the arms 38 and 39 in said transverse direction causes the pinion 37 to move in the rightward and leftward transverse direction.

Furthermore, a roller 48 is supported by the pair of arms 38 and 39 through bearings 49 in a manner that allows the roller 48 to be rotatable about a substantially vertical axis as center C of rotation. The pinion 37 and the roller 48 are arranged along the rightward and leftward transverse direction. By sandwiching the nut 35 between the roller 48 and the pinion 37, the pinion 37 is connected to the nut 35. The pinion 37 is meshed with the rear wheel steering rack 12.

In the above arrangement, since the axis 34c of the screw shaft 34 is eccentrically arranged by "e" off the axis 9c of the input shaft 9, the rotation of the input shaft 9 causes the screw shaft 34 to rotate about its axis 34c and to revolve around the axis 34c. Thus, the screw shaft 34 rotates about the axis 9c of the input shaft 9 and whirls around the axis 9c of the input shaft 9.

The rotation of the screw shaft 34 causes the nut 35 to move in the backward and forward direction of the vehicle. The rack 36 which is formed on the nut 35 moves in the backward and forward direction of the vehicle by the backward and forward movement of the nut 35. The pinion 37 which is meshed with the rack 36 rotates about said substantially vertical axis as center A of rotation by the backward and forward movement of the rack 36. The rear wheel steering rack 12 which is meshed with the pinion 37 moves in said transverse direction by the rotation of the pinion 37.

The nut 35 moves both in the substantially up-and-down direction and the rightward and leftward transverse direction by the whirling motion of the screw shaft 34. The arms 38 and 39 swing in said transverse direction about the center B of swing by the transverse movement of the nut 35. The pinion 37 moves in said transverse direction by said transverse motion of the arms 38 and 39. The rear wheel steering rack 12 which is meshed with the pinion 37 moves in said transverse direction by said transverse movement of the pinion 37.

Thus, the transverse movement of the rear wheel steering rack 12 is a combination of the movement based on the rotation of the screw shaft 34 and of the movement based on the whirling motion of the screw shaft 34. Setting properly the gear ratios of the pinion 37 to the racks 36 and 12 and eccentricity "e" of the axis 34c of the screw shaft 34 to the axis 9c of the input shaft 9 allows the rear wheel steering rack 12 to move in a desired manner in response to variations of the front wheel steering angle.

Figure 5:
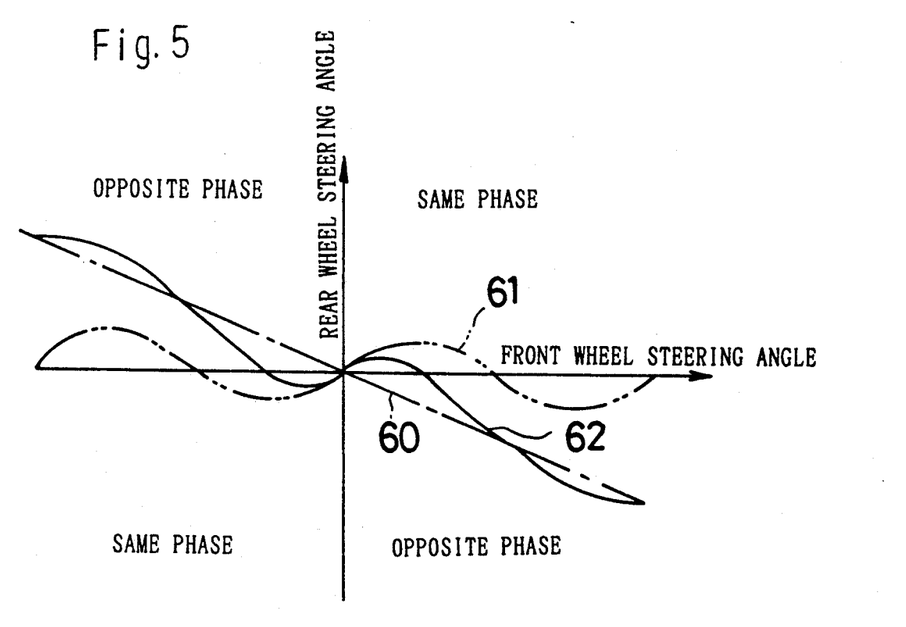
FIG. 5 shows a graph illustrating the relationship between a front wheel steering angle and a rear wheel steering angle in the four-wheel steering vehicle according to the embodiment of the present invention.

FIG. 5 shows the relationship between the front wheel steering angle and the rear wheel steering angle in the four-wheel steering vehicle. An alternate long and short dash line 60 represents a case where the rear wheel steering rack 12 is moved based on only the rotation of the screw shaft 34, and, in this case, the rear wheel steering angle varies in proportion to the front wheel steering angle. An alternate long and two dashes line 61 represents a case where the rear wheel steering rack 12 is moved based on only the whirling motion of the screw shaft 34, and, in this case, the rear wheel steering angle varies in a periodically in response to the front wheel steering angle. A solid line 62 represents a case where the rear wheel steering rack 12 is moved based on both the rotation and the whirling motion of the screw shaft 34. In other words, the solid line 62 represents the combination of both the lines 60 and 61. The relationship between the front wheel steering angle and the rear wheel steering angle in the above-mentioned four-wheel steering vehicle is illustrated by the line 62. To be more precise, while the front wheel steering angle is smaller, both the front wheels 1 and the rear wheels 10 remain in phase, i.e., both the front wheels 1 and the rear wheels 10 are steered in the same orientation. When the front wheel steering angle increases, the front wheels 1 and the rear wheels 10 become opposite with each other in phase, i.e., the front wheels 1 and the rear wheels 10 are reversely steered with each other. Such a relationship is desirable in a four-wheel steering vehicle.

Figure 6:
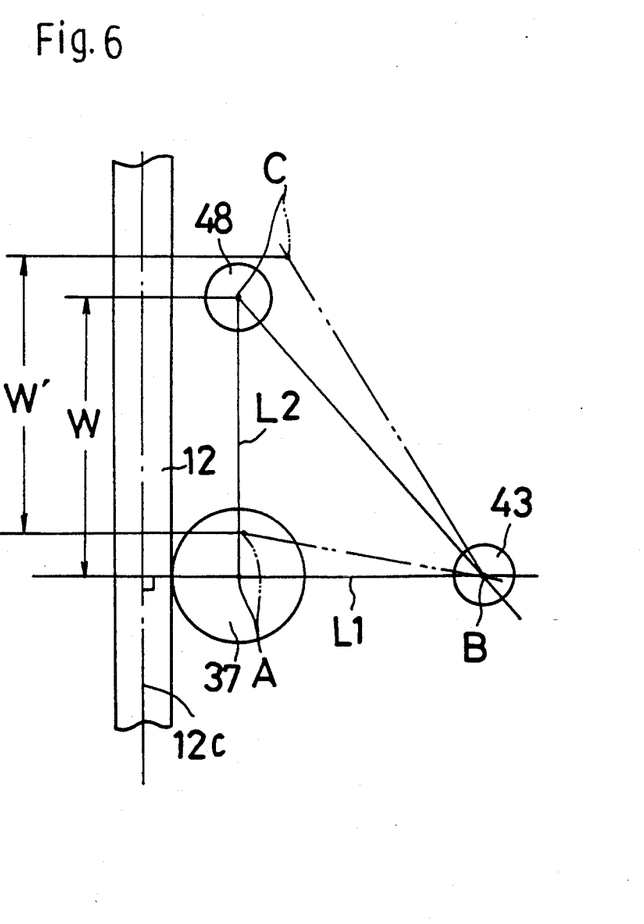
FIG. 6 is a drawing illustrating the function of the rear wheel steering device according to the embodiment of the present invention.

As shown in FIG. 1 and FIG. 6, the line segment connecting the center A of rotation of the pinion 37 to the center C of rotation of the roller 48 is parallel to an axis 12c oriented from right to left of the rear wheel steering rack 12 in the straight track steering state shown in the figures. When the pinion 37 exerts a pressure which acts on the rear wheel steering rack 12 based on the whirling motion of the screw shaft 34, such an arrangement allows pressure components other than one acting along the rightward and leftward direction to keep to a minimum; thus, the pressure is transmitted from the pinion 37 to the rear wheel steering rack 12 in an effective manner.

Since said transverse movement of the pinion 37 is based on the swing of the arm 38 and 39 about the center B of swing, the pinion 37 moves in an arc orbit. When the pinion 37 moves in the arc orbit, the backlash between the teeth of the pinion 37 and the teeth of the rear wheel steering rack 12 may vary. As shown in FIG. 2, a support yoke 50 and springs 51 are inserted into a bore 32f which is formed into the housing 32, and an adjusting screw 52 is screwed into the bore 32f. The support yoke 50 is movable in backward and forward direction of the vehicle. In such an arrangement, the support yoke 50 presses, with resiliency of the springs 51, the rear wheel steering rack 12 against the pinion 37, thereby preventing the backlash between the teeth of the pinion 37 and the teeth of the rear wheel steering rack 12 from varying, and thus, moving the rear wheel steering rack 12 in a smooth manner. Adjusting the length of engagement of the adjusting screw 52 into the bore 32f controls the range of travel permitted for the support yoke 50.

As shown in FIG. 1 and FIG. 6, the line segment connecting the center A of rotation of the pinion 37 to the center B of swing of the arms 38 and 39 is perpendicular to the axis 12c of the rear wheel steering rack 12 in the straight track steering state shown in the figures. This restricts backlash variations between the pinion 37 and the rear wheel steering rack 12 to a minimum while the pinion 37 moves in the arc orbit. Such an arrangement minimizes variations of the pressure which the support yoke 50 exerts on the rear wheel steering rack 12 against the pinion 37, thereby allowing the rear wheel steering rack 12 to move in a smooth manner.

Since said transverse movement of the pinion 37 and the roller 48 is based on the swing of the arm 38 and 39 about the center B of swing, the pinion 37 and roller 48 move in the arc orbit. Thereby in response to the displacement arising from the swing of the arm 38 and 39, the transverse distance along the rightward and leftward direction between the pinion 37 and the roller 48 varies accordingly. In the straight track steering state as shown in FIG. 6, the line segment L1 connecting the center A of rotation of the pinion 37 to the center B of swing of the arms 38 and 39 is perpendicular to an axis 12c of the rear wheel steering rack 12, and the line segment L2 connecting the center A of rotation of the pinion 37 to the center C of rotation of the roller 48 is parallel to an axis 12c of the rear wheel steering rack 12. Thus, the transverse distance W between the pinion 37 and the roller 48 is at its longest distance in the straight track steering position. When the arms 38 and 39 move out of the straight track steering position, the transverse distance between the pinion 37 and the roller 48 decreases from W to W'.

The contact portion of the nut 35 with the roller 48 is formed unevenly corresponding to the change of the transverse distance between the pinion 37 and the roller 48. To be more precise, as shown in FIG. 1, the nut 35 has both a projected area 35a and recess area 35b. The projected area 35a contacts with the roller 48 in the straight track steering position, the recess area 35b contact with the roller 48 in rightward or leftward steering position. In this embodiment, the geometry between the projected area 35b and the recess area 35b is stepwise shaped. The step difference $\delta$ between the projected area 35a and the recess area 35b is determined by the difference between said transverse distance W in the straight track steering state and said transverse distance W' in rightward or leftward steering state. Such an arrangement allows the width of the nut 35 to narrow when the transverse distance between the pinion 37 and the roller 48 is smaller, and allows the width of the nut 35 to widen when the transverse distance between the pinion 37 and the roller 48 is larger. This prevents the pinion 37 from being pressed against the nut 35 with a large force, and from generating an excessive clearance between the pinion 37 and the nut 35. Such an arrangement makes it possible for the rear wheel steering rack 12 to accurately follow both the rotation of the screw shaft 34 and the whirling motion of the screw shaft 34. Desired steering characteristics may be thus achieved. In the contact portion of the nut 35 with the roller 48, the projected area 35a may join the recess area 35b by curved surfaces in stead of stepwise joining between both.

Figure 3:
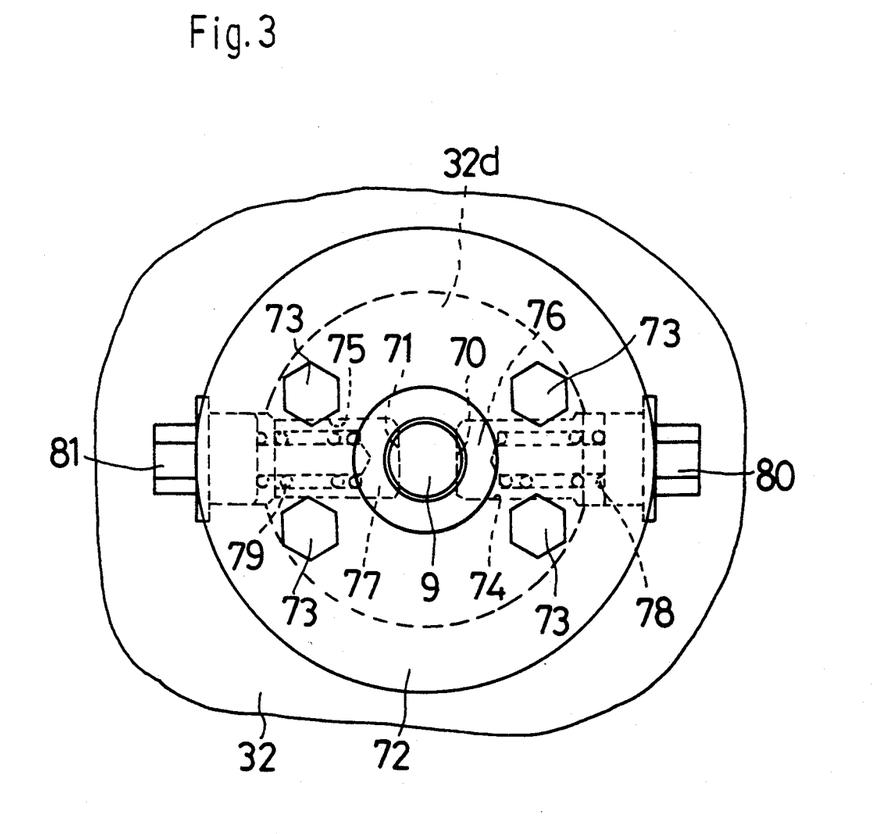
FIG. 3 is a front view showing the major part of the rear wheel steering device according to the embodiment of the present invention.

As shown in FIG. 1 through FIG. 3, a pair of reference surfaces 70 and 71 are formed on the exterior of the projected portion of the input shaft 9 out of the housing 32. Both reference surfaces 70 and 71 are covered with a cylindrically shaped covering member 72. As shown in FIG. 3, the covering member 72 is fitted to the block 32d of the housing 32 with bolts 73. Both the reference surfaces 70 and 71 are apart with each other along the axis of the input shaft 9 and 180 degrees apart with each other along the circumference of the input shaft 9.

A pair of holes 74 and 75 are formed in the covering member 72. One hole 74 extends from the exterior of the covering member 72 to one reference surface 70, and the other hole 75 extends from the exterior of the covering member 72 to the other reference surface 71. A pressure member 76 and a compression coil spring 78 are inserted into the hole 74, and a pressure member 77 and a compression coil spring 79 are inserted into the other hole 75. Each of the pressure members 76 and 77 is cylindrical, and movable guided by the inner circular walls of the holes 74 and 75 in the radial direction of the input shaft 9. The openings of the holes 74 and 75 of the covering member 72 are closed by screwing plugs 80 and 81 into the holes 74 and 75. The compression coil spring 78 is placed between the plug 80 and the pressure member 76, and the compression coil spring 79 is placed between the plug 81 and the pressure member 77. One pressure member 76 is pressed against the reference surface 70 by resiliency of the compression coil spring 78, and the other pressure 77 is pressed against the other reference surface 71 by resiliency of the compression coil spring 79. In this embodiment, reference surfaces 70 and 71 and end surfaces of the pressure members 76 and 77 are planar. When reference surfaces 70 and 71 are interfaced with end surfaces of the pressure members 76 and 77 respectively, the input shaft 9 is in its straight track steering position. In this arrangement, the pressure members 76 and 77 are pressed against the reference surfaces 70 and 71 respectively, by means of resiliency of the compression coil springs 78 and 79, thereby generating a force in a manner that the input shaft 9 is restored to its straight track steering position. As a result, an operating force required for putting the steering wheel 6 to the straight track steering position is reduced. Since the range of rotation of the input shaft 9 is less than 360 degrees, no force generates for the input shaft 9 to restore to some other position than its straight track steering position. In this arrangement, a sufficient restoring force results, because the compression coil springs 78 and 79 still presses the pressure members 76 and 77 respectively against the reference surfaces 70 and 71 even when the input shaft 9 is in the vicinity of its straight track steering position. The compression coil springs 78 and 79 are inserted into respective holes 74 and 75 of the covering member 72, and mounted by screwing respective plugs 80 and 81 into the holes 74 and 75. Thereby the compression coil springs 78 and 79 are easily and surely mounted. Also, helical wires which constitute each of the compression coil springs 78 and 79 do not rub with each other, thereby suffering no wear. Since the pair of reference surfaces 70 and 71 are 180° apart with each other around the circumference of the input shaft 9, resiliency which the compression coil spring 78 exerts on the input shaft 9 is balanced with resiliency which the compression coil spring 79 exerts on the input shaft 9. As a result, no uneven force acts on the input shaft 9; thus, bearings 30 and 31, both of which support the input shaft 9, will suffer no deviative wear. Since the pair of the reference surfaces 70 and 71 are disposed apart with each other along the axis of the input shaft 9, even when the input shaft 9 rotates by 180°, the pressure member 76 which is designed to press against the reference surface 70 does not press against the other reference surface 71, and the pressure member 77 which is designed to press against the other reference surface 71 does not press against the reference surface 70.

The present invention is not limited to the above-mentioned embodiment. For example, an acme screw thread may be used instead of the screw shaft 34, and an acme nut may be used instead of the nut 35. For the purpose of reducing friction, a synthetic resin member may be inserted between the input shaft 9 and each of the pressure members 76 and 77, the pressure members 76 and 77 may be coated with synthetic resin, or the pressure members 76 and 77 themselves may be made of synthetic resin of a low frictional coefficient. The reference surfaces and the end surfaces of the pressure members are not limited to be planar; they may be curved surfaces.

What is claimed is:

1. A rear wheel steering device for a four-wheel steering vehicle in which rear wheels are steered by means of a transverse movement in the rightward and leftward direction of a rear wheel steering rack, the rear wheel steering device comprising:
   an input shaft which rotates about an axis oriented from front to rear in response to a steering angle of front wheels, a screw shaft which is united with the input shaft and has an axis eccentrically arranged with the axis of the input shaft, a nut which is meshed with the screw shaft, a rack formed on the nut, and a pinion meshed with the rack and connected to the nut, wherein the pinion is supported in a manner that it is rotatable about a substantially vertical axis and movable in the rightward and leftward transverse direction, the pinion is meshed with the rear wheel steering rack, the screw shaft rotates eccentrically in response to the rotation of the input shaft, the nut moves in the backward and forward direction of the vehicle in response to the rotation of the screw shaft, the pinion rotates about a substantially vertical axis in response to the backward and forward movement of the nut, the rear wheel steering rack moves in said transverse direction in response to the rotation of the pinion, the nut moves in the rightward and leftward transverse direction in response to the eccentric motion of the screw shaft, the pinion moves in said transverse direction in response to said transverse movement of the nut, and the rear wheel steering rack moves in said transverse direction in response to said transverse movement of the pinion.

2. A rear wheel steering device according to claim 1, wherein the rear wheel steering device comprises:
   a housing mounted on the body of the vehicle, a swing member which is supported by the housing in a manner that allows the swing member to swing in the rightward and leftward transverse direction about a substantially vertical axis, a roller which is supported by the swing member with the pinion in a manner that allows the pinion and the roller to rotate about a substantially vertical axis, wherein the pinion and the roller are arranged along the rightward and leftward transverse direction, the pinion is connected to the nut by sandwiching the nut between the pinion and the roller.

3. A rear wheel steering device according to claim 2, wherein the transverse distance along the rightward and leftward direction between the pinion and the roller varies in response to the swing of the swing member, and the contact portion of the nut with the roller is formed unevenly according to the variations of the transverse distance.

4. A rear wheel steering device according to claim 2, wherein in the straight track steering position, the line segment connecting the center of rotation of the pinion to the center of rotation of the roller is parallel to a transverse axis oriented from right to left of the rear wheel steering rack and the line segment connecting the center of rotation of the pinion to the center of swing of the swing member is perpendicular to the transverse axis of the rear wheel steering rack.

5. A rear wheel steering device according to claim 3, wherein in the straight track steering position, the line segment connecting the center of rotation of the pinion to the center of rotation of the roller is parallel to a transverse axis oriented from right to left of the rear wheel steering rack and the line segment connecting the center of rotation of the pinion to the center of swing of the swing member is perpendicular to the transverse axis of the rear wheel steering rack.

6. A rear wheel steering device according to claim 1, wherein the range of rotation of the input shaft is set to less than 360°, a reference a surface is formed on the exterior of the input shaft, a covering member is provided to cover the reference surface, a pressure member is held by the covering member, and a compression coil spring, is provided to press the pressure member against the reference surface, and a restoring force is generated to restore the input shaft to its straight track position by pressing the pressure member against the reference surface.

7. A rear wheel steering device according to claim 2, wherein the range of rotation of the input shaft is set to less than 360°, a reference surface is formed on the exterior of the input shaft, a covering member is provided to cover the reference surface, a pressure member is held by the covering member, and a compression coil spring, is provided to press the pressure member against the reference surface, and a restoring force is generated to restore the input shaft to its straight track position by pressing the pressure member against the reference surface.

8. A rear wheel steering device according to claim 3, wherein the range of rotation of the input shaft is set to less than 360°, a reference surface is formed on the exterior of the input shaft, a covering member is provided to cover the reference surface, a pressure member is held by the covering member, and a compression coil spring, is provided to press the pressure member against the reference surface, and a restoring force is generated to restore the input shaft to its straight track position by pressing the pressure member against the reference surface.

9. A rear wheel steering device according to claim 4, wherein the range of rotation of the input shaft is set to less than 360°, a reference surface is formed on the exterior of the input shaft, a covering member is provided to cover the reference surface, a pressure member is held by the covering member, and a compression coil spring, is provided to press the pressure member against the reference surface, and a restoring force is generated to restore the input shaft to its straight track position by pressing the pressure member against the reference surface.

10. A rear wheel steering device according to claim 5, wherein the range of rotation of the input shaft is set to less than 360°, a reference surface is formed on the exterior of the input shaft, a covering member is provided to cover the reference surface, a pressure member is held by the covering member, and a compression coil spring, is provided to press the pressure member against the reference surface, and a restoring force is generated to restore the input shaft to its straight track position by pressing the pressure member against the reference surface.

11. A rear wheel steering device according to claim 6, wherein a pair of reference surfaces, a pair of pressure members, and a pair of compression coil springs are provided, wherein both references surfaces are apart from each other along the axis of the input shaft, and 180° apart from each other along the circumference of the input shaft 9.

12. A rear wheel steering device according to claim 7, wherein a pair of reference surfaces, a pair of pressure members, and a pair of compression coil springs are provided, wherein both references surfaces are apart from each other along the axis of the input shaft, and 180° apart from each other along the circumference of the input shaft 9.

13. A rear wheel steering device according to claim 8, wherein a pair of reference surfaces, a pair of pressure members, and a pair of compression coil springs are provided, wherein both references surfaces are apart from each other along the axis of the input shaft, and 180° apart from each other along the circumference of the input shaft 9.

14. A rear wheel steering device according to claim 9, wherein a pair of reference surfaces, a pair of pressure members, and a pair of compression coil springs are provided, wherein both references surfaces are apart from each other along the axis of the input shaft, and 180° apart from each other along the circumference of the input shaft 9.

15. A rear wheel steering device according to claim 10, wherein a pair of reference surfaces, a pair of pressure members, and a pair of compression coil springs are provided, wherein both references surfaces are apart from each other along the axis of the input shaft, and 180° apart from each other along the circumference of the input shaft 9.

16. A rear wheel steering device according to claim 1, wherein a pair of reference surfaces are formed along the exterior of the input shaft, the reference surfaces being disposed apart from each other along the axis of the input shaft and 180 degrees apart from each other along the circumference of the input shaft, wherein a covering member is provided to cover the reference surfaces, wherein a pair of pressure members are provided, the pressure members being held by the covering member, and wherein a pair of compression coil springs are provided to press the pressure members against the references surfaces, thereby generating a restoring force to restore the input shaft to it straight track position.

17. A rear wheel steering device according to claim 2, wherein a pair of reference surfaces are formed along the exterior of the input shaft, the reference surfaces being disposed apart from each other along the axis of the input shaft and 180 degrees apart from each other along the circumference of the input shaft, wherein a covering member is provided to cover the reference surfaces, wherein a pair of pressure members are provided, the pressure members being held by the covering member, and wherein a pair of compression coil springs are provided to press the pressure members against the references surfaces, thereby generating a restoring force to restore the input shaft to it straight track position.

18. A rear wheel steering device according to claim 3, wherein a pair of reference surfaces are formed along the exterior of the input shaft, the reference surfaces being disposed apart from each other along the axis of the input shaft and 180 degrees apart with each other along the circumference of the input shaft, wherein a covering member is provided to cover the reference surfaces, wherein a pair of pressure members are provided, the pressure members being held by the covering member, and wherein a pair of compression coil springs are provided to press the pressure members against the references surfaces, thereby generating a restoring force to restore the input shaft to it straight track position.

19. A rear wheel steering device according to claim 4, wherein a pair of reference surfaces are formed along the exterior of the input shaft, the reference surfaces being disposed apart from each other along the axis of the input shaft and 180 degrees apart from each other along the circumference of the input shaft, wherein a covering member is provided to cover the reference surfaces, wherein a pair of pressure members are provided, the pressure members being held by the covering member, and wherein a pair of compression coil springs are provided to press the pressure members against the references surfaces, thereby generating a restoring force to restore the input shaft to it straight track position.

* * * * *